United States Patent
Guo et al.

(10) Patent No.: US 12,427,991 B2
(45) Date of Patent: Sep. 30, 2025

(54) METHOD FOR DETECTING SURFACE GRADIENT OF UNSTRUCTURED ROAD BASED ON LIDAR

(71) Applicant: Tage IDriver Technology Co., Ltd., Hefei (CN)

(72) Inventors: Xudong Guo, Beijing (CN); Yuxiao Lu, Beijing (CN); Jie Wang, Beijing (CN); Lei Han, Beijing (CN); Haijie Wu, Beijing (CN); Zhao Liu, Beijing (CN)

(73) Assignee: Tage IDriver Technology Co., Ltd., Hefei (CN)

( * ) Notice: Subject to any disclaimer, the term of this patent is extended or adjusted under 35 U.S.C. 154(b) by 339 days.

(21) Appl. No.: 18/110,048

(22) Filed: Feb. 15, 2023

(65) Prior Publication Data

US 2023/0406320 A1  Dec. 21, 2023

(30) Foreign Application Priority Data

Jun. 15, 2022  (CN) .......................... 202210680780.3

(51) Int. Cl.
*B60W 40/06* (2012.01)
*B60W 60/00* (2020.01)
*G01S 17/89* (2020.01)

(52) U.S. Cl.
CPC .......... *B60W 40/06* (2013.01); *B60W 60/001* (2020.02); *G01S 17/89* (2013.01); *B60W 2420/408* (2024.01)

(58) Field of Classification Search
None
See application file for complete search history.

(56) References Cited

U.S. PATENT DOCUMENTS

| | | | |
|---|---|---|---|
| 2022/0374014 A1* | 11/2022 | Xu | .......................... G01S 17/08 |
| 2023/0215026 A1* | 7/2023 | Du | .......................... H04N 23/90 |
| | | | 701/25 |
| 2023/0305125 A1* | 9/2023 | Wang | ...................... G01S 17/89 |

FOREIGN PATENT DOCUMENTS

CN  106646508 A *  5/2017  ............... G01C 9/00

OTHER PUBLICATIONS

English translation of CN-106646508-A. (Year: 2017).*

* cited by examiner

*Primary Examiner* — Thomas D Lee
(74) *Attorney, Agent, or Firm* — Kirk A. Wilson; Joseph T. Guy; Patent Filing Specialist Inc.

(57) ABSTRACT

A method for detecting a surface gradient of an unstructured road based on Lidar includes: obtaining an environmental point cloud of a target region by using a Lidar, and filtering out a point cloud of a non-surface region to obtain a point cloud of a surface region; calculating a normal vector of the point cloud of the surface region, and obtaining an included angle of the surface of each region relative to a coordinate system of the Lidar; and obtaining pitching angle information of a vehicle at this time from a vehicle-mounted inertial measurement unit (IMU), and correcting the included angle with the pitching angle information to obtain the gradient of the surface of each region.

6 Claims, 2 Drawing Sheets

METHOD FOR DETECTING SURFACE GRADIENT OF UNSTRUCTURED ROAD BASED ON LIDAR

CROSS REFERENCE TO RELATED APPLICATION

This patent application claims the benefit and priority of Chinese Patent Application No. 202210680780.3, filed with the China National Intellectual Property Administration on Jun. 15, 2022, the disclosure of which is incorporated by reference herein in its entirety as part of the present application.

TECHNICAL FIELD

The present disclosure relates to the field of automatic driving, is applicable to real-time gradients in on-vehicle scenarios, and more particularly relates to a method for detecting a surface gradient of an unstructured road based on Lidar.

BACKGROUND

With the development and progress of science and technology, autonomous vehicles are gradually stepping into people's lives. However, how to accurately sense complex external environments is still a major problem for the unmanned driving technology. In an unmanned driving system, a sensing module provides information of surroundings for a decision-making module, and accurate sensing is a precondition of the implementation of unmanned driving. The detection of road gradient in the driving direction is also a non-negligible part in the field of sensing. Providing gradient information for the decision-making module allows an autonomous vehicle to better control a speed and torque of an engine or a motor and then to better control a vehicle speed. Especially in a scenario of a mine with frequently changing gradients, it is important for a driverless mining truck to detect gradients and control truck speeds. Three-dimensional Lidars have been widely applied to the field of automatic driving for their characteristics of wide range, high accuracy, and good adaptability.

In the prior art, the invention patent No. CN101844560A discloses a device for detecting the road gradient for motor vehicles, which provides a device for detecting the gradient with a hall element and a simple pendulum structure. The device uses the hall element, and the simple pendulum structure which is opposite to the hall element and capable of swinging in a longitudinal direction of the motor vehicle. When the motor vehicle moves up or down a slope, a magnetic steel of the simple pendulum structure swings relative to the hall element under the action of the component force of the gravity. The hall element detects a change in magnetic force and transmits a signal to a control unit. The control unit performs calculation to obtain the gradient of a road on which the motor vehicle travels and find out whether the motor vehicle moves up or down the slope. The invention patent No. CN102313535B discloses a method for detecting the gradient, which provides a method for detecting the gradient with a speed sensor and an acceleration sensor. The method includes: obtaining an acceleration signal using an acceleration sensor and obtaining a speed signal using a speed signal module; correcting a correction value for the acceleration signal when a speed value of the speed signal reaches a preset speed, the correction value representing a signal value output by the acceleration sensor when a motor vehicle is located on a level surface and still; obtaining an acceleration value of the motor vehicle based on the speed signal; obtaining a gradient value based on the corrected correction value, the acceleration signal, the acceleration value of the motor vehicle, and the gravitational acceleration of the earth; and outputting the gradient value. The invention patent No. CN111458722B discloses a method of map building based on onboard Lidar for vehicles in a complex environment with a gradient so as to solve the problem of the degradation of complex Lidar simultaneous localization and mapping (SLAM) and autonomous navigation capabilities. Firstly, Lidar data is preprocessed to remove data extending beyond the effective range of the Lidar. Predictive navigation information of the vehicle is then obtained by recursion from data of an accelerometer and a gyroscope, and transmitted to a gradient algorithm for Lidar data correction and subjected to Kalman filtering afterwards, thereby obtaining navigation information of the vehicle. Finally, an environmental map is updated using the filtered navigation information of the vehicle. In a complex gradient environment, Lidar navigation information with higher accuracy can be obtained by the SLAM method provided in the present disclosure, and an accurate map is drawn.

However, in the prior art, only the present gradient of the ground surface carrying a vehicle can be detected, and the gradient of a road ahead cannot be detected. For an autonomous vehicle, in a scenario with a sharp change in gradient, it is difficult for a decision-making module to control a vehicle speed without the gradient information of a road ahead, and therefore, it is important and necessary to provide the gradient information of the road surface ahead for the decision-making module.

SUMMARY

An objective of the present disclosure is to overcome the shortcomings in the prior art and provide a method for detecting the surface gradient of an unstructured road based on Lidar. The method can provide real-time gradient information of a road ahead in the driving direction for decision making of automatic driving.

The present disclosure provides a method for detecting a surface gradient of an unstructured road based on Lidar, including the following steps:
(1) obtaining an environmental point cloud of a target region by using a Lidar, and filtering out a point cloud of a non-surface region to obtain a point cloud of a surface region, where the target region includes the surface region and the non-surface region;
(2) calculating a normal vector of the point cloud of the surface region, and obtaining an included angle of the surface of each region relative to a coordinate system of the Lidar; and
(3) obtaining pitching angle information of a vehicle at this time from a vehicle-mounted inertial measurement unit (IMU), and correcting the included angle with the pitching angle information to obtain the gradient of the surface of each region.

Step (1) may specifically include the following steps:
(1.1) ranking all input point clouds by height in an ascending order, and calculating a height mean of first $N_{LPR}$ points;
(1.2) extracting a point cloud of an initial surface according to the height mean and a distance threshold, and obtaining a surface plane by fitting according to the point cloud of the initial surface; and (1.3) performing $N_{itr}$ iterations, performing point cloud traversal, and continuously adding point clouds within the distance threshold to the surface plane to the point cloud of the initial surface, thereby obtaining a surface point cloud.

In step (2), the division of regions may be set based on requirements of an application scenario of an autonomous vehicle and a decision-making module.

Step (2) may include obtaining the corresponding normal vector n of the surface point cloud by solving an optimized objective function of each region, allowing point multiplication of a vector formed by a central point of the surface point cloud of the region and each point therein, and the normal vector n to approach 0 as much as possible, namely, maintaining perpendicular as much as possible.

Step (2) may further include obtaining an included angle θ between a component of the normal vector n on the plane of the coordinate system YZ of the Lidar and a negative direction of Y axis of the coordinate system YZ of the Lidar.

The obtaining of the normal vector n in step (2) may specifically include the following steps:

expressing the optimized objective function as $$\min_{c,n,\|n\|=1} \sum_{i=1}^{n} ((x_i - c)^T n)^2,$$

and letting $y_i = x_i - c$;

expressing the above formula as $$\min_{\|n\|=1} \sum_{i=1}^{n} (y_i^T n)^2;$$

continuously deducing $$\min_{n^T n = 1} \sum_{i=1}^{n} n^T y_i y_i^T n \to \min_{n^T n = 1} n^T \left( \sum_{i=1}^{n} y_i y_i^T \right) n \to \min_{n^T n = 1} n^T (YY^T) n,$$

where $YY^T$ is a covariance matrix of 3*3;

solving by using Lagrange algorithm, and letting $f((n) = n^T (YY^T)$:

$$\tau(n, \lambda) = f(n) - \lambda(n^T n - 1);$$

$$\nabla \tau = 0 \implies \frac{\partial \tau}{\partial n} = 0 \implies (YY^T)n = \lambda n;$$

$$n^T n = 1;$$

The normal vector n is a feature vector of the covariance matrix $YY^T$; according to principal component analysis (PCA), a normal vector of a target point cloud cluster is known to be a feature vector corresponding to a minimum feature value, and the included angle between the component of the normal vector n on the plane of the coordinate system YZ of the Lidar and the negative direction of Y axis of the coordinate system YZ of the Lidar at this time is denoted as θ.

Correcting the included angle with the pitching angle information in step (3) may specifically include supplementing the pitching angle information to the included angle.

The method for detecting a surface gradient of an unstructured road based on Lidar provided in the present disclosure may have the following advantages.

1) An algorithm for acquiring gradient information of different distance segments of a road in front of a vehicle in real time is used, which may obtain a time margin for an execution mechanism for vehicle speed control, thereby facilitating the design of a control strategy and the improvement of a control accuracy. In an environment with a sharp change in gradient, the gradient detection on a road ahead is beneficial for a mining truck to control the its own speed, and the safety and stability of unmanned driving are improved.

2) A multi-region point cloud information fusion algorithm is adopted in the present disclosure. Point cloud information is provided for a vehicle by scanning a road in front of the vehicle. A point cloud of the road surface is extracted by a surface detection algorithm. A normal vector of the surface point cloud is calculated for each region. Finally, a pitching angle of the vehicle is obtained by IMU, and the gradient information of the road surface ahead is obtained eventually.

BRIEF DESCRIPTION OF THE DRAWINGS

To describe the technical solutions in the embodiments of the present disclosure or in the prior art more clearly, the accompanying drawings required for describing the embodiments or the prior art will be described briefly below. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

The specific implementations of the present disclosure will be described below in detail. It should be noted that the following implementations are merely intended to further illustrate the present disclosure and cannot be construed as limiting the protection scope of the present disclosure. Any unessential improvement and adjustment made to the present disclosure by a person skilled in the art according to the contents of the present disclosure should be included in the protection scope of the present disclosure.

Figure 1:
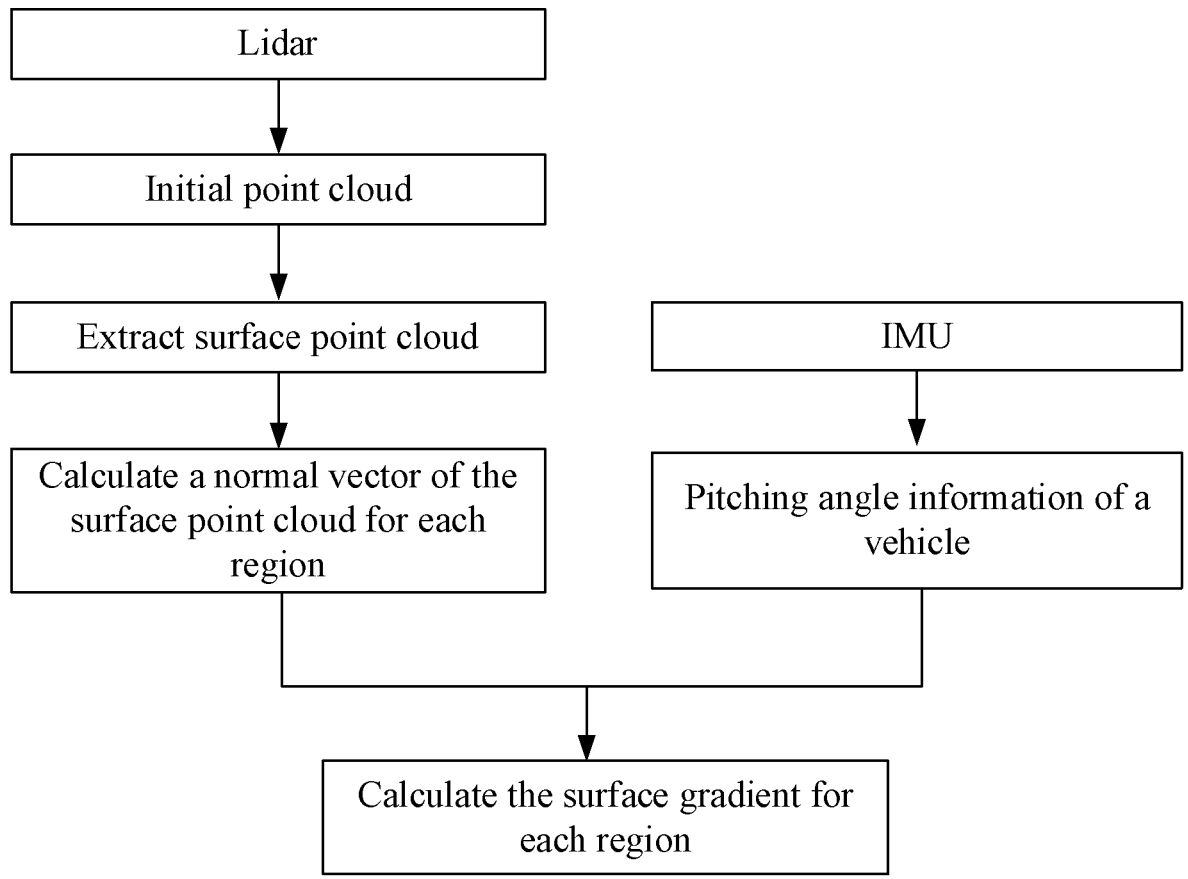
FIG. 1 is a flowchart of a method for detecting a gradient.
Figure 2:
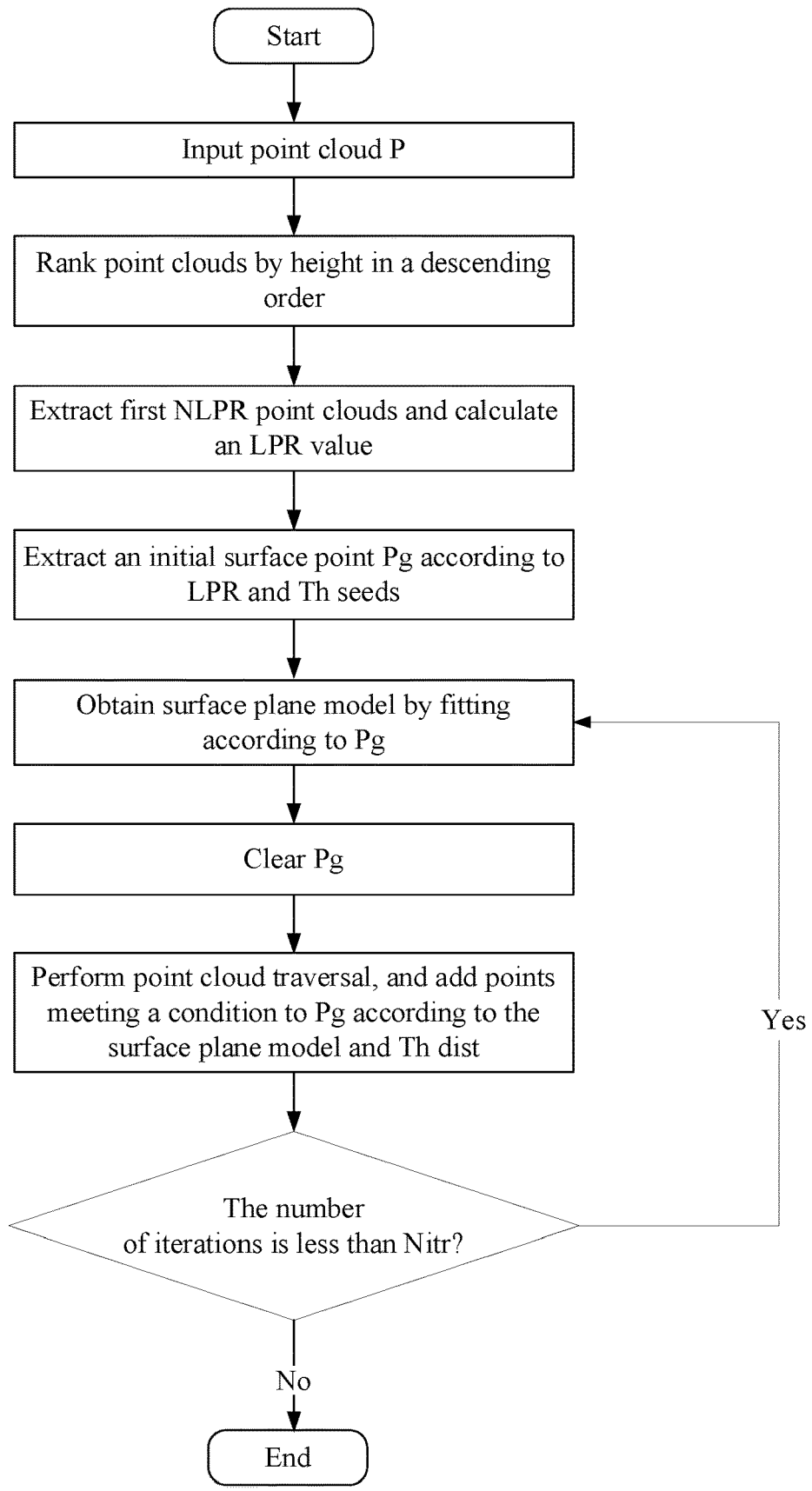
FIG. 2 is a flowchart of a surface detection algorithm.

The present disclosure provides a method for detecting a surface gradient of an unstructured road based on Lidar. The specific implementations of the method are as shown in FIG. 1 and FIG. 2, where FIG. 1 is a flowchart of a method for detecting the gradient, and FIG. 2 is a flowchart of a surface detection algorithm. A brief introduction is provided below.

Three-dimensional Lidars have been widely applied to the field of automatic driving for their characteristics of wide range, high accuracy, and good adaptability. Point cloud information is provided for a vehicle by scanning a road in front of the vehicle. A point cloud of the road surface is extracted by the surface detection algorithm. A normal vector of the surface point cloud is calculated for each region. Finally, a pitching angle of the vehicle is obtained by IMU, and the gradient information of the road surface ahead is obtained eventually.

In particular, the present disclosure provides a method for detecting a surface gradient of an unstructured road based on Lidar, including the following steps:

Step 1, an environmental point cloud of a target region is obtained by using a Lidar; a point cloud $P_{ng}$ of a non-surface region is filtered out to obtain a point cloud of a surface region, where the target region includes the surface region and the non-surface region.

Specifically, in the process of filtering out the point cloud $P_{ng}$ of the non-surface region to obtain the point cloud of the surface region, firstly, all input point clouds P are ranked by height in an ascending order. A height mean LPR of first $N_{LPR}$ points is calculated. A point cloud $P_g$ of an initial surface is extracted according to the height mean LPR and a distance threshold $Th_{seeds}$, and a surface plane is obtained by fitting according to the point cloud $P_g$ of the surface. Then, $N_{itr}$ iterations are performed, and point cloud traversal is performed. Point clouds $P_g$ within the distance threshold $Th_{dist}$ to the surface plane are continuously added to the point cloud of the initial surface, thereby obtaining a surface point cloud.

For the selection of $N_{LPR}$ in $N_{LPR}Th_{seeds}N_{itr}$, due to different resolutions of different radars, the number of point clouds per frame may differ. Generally, for a 16-line Lidar, a half of the number of point clouds per frame is taken as the value of $N_{LPR}$; for a 32-line Lidar, a quarter of the number of point clouds per frame is taken as the value of $N_{LPR}$, and so on. The 32-line Lidar is used in this embodiment, and therefore, a quarter of the number of point clouds per frame is selected as the value of $N_{LPR}$. The distance threshold $Th_{seeds}$ is selected according to a road condition to which the algorithm is applied. The present embodiment is applied to an unstructured road such as a mine area. Since the road is rugged, a large value of $Th_{seeds}$ should be selected, and 0.1 is selected in this embodiment. The larger the number $N_{itr}$ of iterations, the more accurate the result. However, the running speed of the algorithm may decrease. In accordance with the hardware performance used in this embodiment, 5 iterations are selected so that a good balance can be achieved between the speed and accuracy of detection.

Step 2, a normal vector of the surface point cloud obtained in the previous step is calculated for each region, thereby obtaining an inclination angle of the surface of each region relative to a coordinate system of the Lidar. When calculating the normal vector of the surface point cloud for each region, the division of regions may be specifically set based on requirements of an application scenario of an autonomous vehicle and a decision-making module. In this embodiment, the decision-making module needs to apply the brake and control the accelerator according to a road condition ahead. In the consideration of a driving condition of the vehicle, normal vectors of surface point clouds of regions 0-5 m and 5-15 m in front of the vehicle are calculated, respectively.

In this step, the normal vector of the surface point cloud of a region is obtained, namely, an optimized objective function $$\min_{c,n,\|n\|=1}\sum_{i=1}^{k}\left((x_i-c)^T n\right)^2$$

is solved. A normal vector n is obtained, allowing point multiplication of a vector formed by a central point of the surface point cloud of the region and each point therein, and the vector n to approach 0 as much as possible, namely, maintaining perpendicular as much as possible. In the optimized objective function, $x_i$ represents coordinates of a point cloud in a three-dimensional space; c represents coordinates of a central point of point clouds of the region; and k represents the total number of the point clouds of the region. The optimized objective function is simplified as $\min_{n^T n=1} n^T (YY^T) n$, and according to the principal component analysis (PCA), the vector n is known to be a minimum feature value of a covariance matrix $YY^T$. The included angle between the component of the vector on the plane of the coordinate system YZ of the Lidar and the negative direction of Y axis of the coordinate system YZ of the Lidar at this time is denoted as θ. Specifically, the solving process is as follows:

$$\min_{c,n,\|n\|=1}\sum_{i=1}^{k}\left((x_i-c)^T n\right)^2$$

By letting $y_i = x_i - c$, the above formula can be transformed into:

$$\min_{\|n\|=1}\sum_{i=1}^{k}\left(y_i^T n\right)^2$$

The following formulas are obtained by continuous deduction:

$$\min_{n^T n=1}\sum_{i=1}^{k} n^T y_i y_i^T n$$

$$\min_{n^T n=1} n^T \left(\sum_{i=1}^{k} y_i y_i^T\right) n$$

$$\min_{n^T n=1} n^T (YY^T) n$$

where is a covariance matrix of 3*3.

Such an optimized objective function with a constraint can be solved by using the Lagrange algorithm. The following formula is defined: $f(n) = n^T(YY^T)$:

$$\tau(n,\lambda) = f(n) - \lambda(n^T n - 1)$$

$$\nabla \tau = 0$$

$$\Rightarrow$$

$$\frac{\partial \tau}{\partial n} = 0$$

$$\frac{\partial \tau}{\partial n} = 0$$

$$\Rightarrow$$

$$(YY^T)n = \lambda n$$

$$n^T n = 1$$

Thus, the vector n is a feature vector of the covariance matrix $YY^T$. By using PCA, a normal vector n of a target point cloud cluster is a feature vector corresponding to a minimum feature value. The included angle between the component of the vector on the plane of the coordinate system YZ of the Lidar and the negative direction of Y axis of the coordinate system YZ of the Lidar at this time is denoted as θ.

Step 3: pitching angle information of a vehicle at this time is obtained from a vehicle-mounted inertial measurement unit (IMU), and the included angle θ obtained in step 2 is corrected with the pitching angle information. That is, the pitching angle information is supplemented to the included angle obtained in step 2, and then a gradient of the surface of each region may be obtained accordingly.

The pitching angle α (namely, the gradient of the road surface carrying the vehicle at this time) of the vehicle at this time is acquired from the vehicle-mounted IMU, and by letting β=α+θ, β at this time is the gradient of a region ahead.

Although the example embodiments of the present disclosure have been described for the purpose of illustration, it will be appreciated by those skilled in the art that various modifications, additions, substitutions and the like may be made in terms of form and detail without departing from the scope and spirit of invention disclosed in the appended claims, and all these changes should fall within the protection scope of the appended claims of the present disclosure. Moreover, different parts of the product and different steps claimed in the present disclosure may be combined in the form of any combination. Therefore, the description of the embodiments disclosed in the present disclosure is intended to describe the present disclosure rather than limit the scope of protection of the present disclosure. Accordingly, the scope of the present disclosure is not limited by the embodiments described above, and is defined by the claims or equivalents thereof instead.

What is claimed is:

1. A method for detecting a surface gradient of an unstructured road based on Lidar, comprising the following steps:
   (1) obtaining an environmental point cloud of a target region by using a Lidar, and filtering out a point cloud of a non-surface region to obtain a point cloud of a surface region, wherein the target region comprises the surface region and the non-surface region;
   (2) calculating a normal vector of the point cloud of the surface region, and obtaining an included angle of the surface of each region relative to a coordinate system of the Lidar; and
   (3) obtaining pitching angle information of a vehicle at this time from a vehicle-mounted inertial measurement unit (IMU), and correcting the included angle with the pitching angle information to obtain a gradient of the surface of each region.

2. The method according to claim 1, wherein step (1) specifically comprises the following steps:
   (1.1) ranking all input point clouds by height in an ascending order, and calculating a height mean of first $N_{LPR}$ points;
   (1.2) extracting a point cloud of an initial surface according to the height mean and a distance threshold, and obtaining a surface plane by fitting according to the point cloud of the initial surface; and
   (1.3) performing $N_{itr}$ iterations, performing point cloud traversal, and continuously adding point clouds within the distance threshold to the surface plane to the point cloud of the initial surface, thereby obtaining a surface point cloud.

3. The method according to claim 1, wherein step (2) comprises obtaining the corresponding normal vector n of the surface point cloud by solving an optimized objective function of each region, allowing point multiplication of a vector formed by a central point of the surface point cloud of the region and each point therein, and the normal vector n1 to approach 0 as much as possible, namely, maintaining perpendicular as much as possible.

4. The method according to claim 3, wherein step (2) further comprises obtaining an included angle θ between a component of the normal vector n on the plane of the coordinate system YZ of the Lidar and a negative direction of Y axis of the coordinate system YZ of the Lidar.

5. The method according to claim 4, wherein the obtaining the normal vector n in step (2) specifically comprises the following steps:
   expressing the optimized objective function as $$\min_{c,n,\|n\|=1} \sum_{i=1}^{n} ((x_i - c)^T n)^2,$$

and letting $y_i = x_i - c$;
   expressing the above formula as $$\min_{\|n\|=1} \sum_{i=1}^{k} (y_i^T n)^2;$$

continuously deducing $$\min_{n^T n=1} \sum_{i=1}^{n} n^T y_i y_i^T n \to \min_{n^T n=1} n^T \left( \sum_{i=1}^{n} y_i y_i^T \right) n \to \min_{n^T n=1} n^T (YY^T) n,$$

wherein $YY^T$ is a covariance matrix of 3*3;
solving by using Lagrange algorithm, and letting $f((n)) = n^T (YY^T)$:

$$\tau(n, \lambda) = f(n) - \lambda(n^T n - 1);$$

$$\nabla \tau = 0 \implies \frac{\partial \tau}{\partial n} = 0 \implies (YY^T)n = \lambda n;$$

$$n^T n = 1;$$

and
   wherein the normal vector n is a feature vector of the covariance matrix $YY^T$; by implementing principal component analysis (PCA), a normal vector of a target point cloud cluster is a feature vector corresponding to a minimum feature value, and the included angle between the component of the normal vector on the plane of the coordinate system YZ of the Lidar and the negative direction of Y axis of the coordinate system YZ of the Lidar at this time is denoted as θ.

6. The method according to claim 5, wherein the correcting the included angle with the pitching angle information in step (3) specifically comprises supplementing the pitching angle information to the included angle.

* * * * *